(12) United States Patent
Consul et al.

(10) Patent No.: US 8,032,537 B2
(45) Date of Patent: Oct. 4, 2011

(54) USING MESSAGE SAMPLING TO DETERMINE THE MOST FREQUENT WORDS IN A USER MAILBOX

(75) Inventors: Ashish Consul, Redmond, WA (US); Suryanarayana M. Gorti, Redmond, WA (US); Michael Geoffrey Andrew Wilson, Sammamish, WA (US); James C. Kleewein, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 12/332,161

(22) Filed: Dec. 10, 2008

(65) Prior Publication Data
US 2010/0145943 A1 Jun. 10, 2010

(51) Int. Cl.
*G06F 17/30* (2006.01)
(52) U.S. Cl. ......... 707/750; 707/613; 704/246; 704/251
(58) Field of Classification Search .................. 707/613, 707/750; 704/246, 251; 379/88.14
See application file for complete search history.

(56) References Cited

U.S. PATENT DOCUMENTS

| 6,198,808 | B1 * | 3/2001 | Martin ........................ 379/88.14 |
| 6,526,382 | B1 | 2/2003 | Yuschik ........................ 704/275 |
| 6,760,694 | B2 | 7/2004 | Al-Kazily et al. ................. 704/2 |
| 2006/0206569 | A1 | 9/2006 | Heidloff et al. ............... 709/206 |
| 2007/0153989 | A1 * | 7/2007 | Howell et al. .............. 379/88.14 |
| 2008/0198981 | A1 | 8/2008 | Skakkebaek et al. ...... 379/88.13 |
| 2009/0319483 | A1 * | 12/2009 | Consul et al. ..................... 707/3 |
| 2010/0142684 | A1 * | 6/2010 | Chang et al. ............... 379/88.14 |
| 2010/0217591 | A1 * | 8/2010 | Shpigel ......................... 704/235 |

OTHER PUBLICATIONS

Cecchini et al; Securing Electronic Mail on the National Research and Academic Network of Italy http://www.usenix.org/event/lisa06/tech/full_papers/cecchini/cecchini.pdf; 2006; 14 pages.
Cohen; Learning Rules that Classify E-Mail;www2.parc.com/istl/projects/mlia/papers/cohen.ps; 8 pages, 1996.
Payne; Learning Email Filtering Rules with Magi a Mail Agent Interface; http://eprints.ecs.soton.ac.uk/7789/1/msc_thesis.pdf; 1994; 72 pages.
Whittaker et al; Jotmail: A Voicemail Interface that Enables You to See What Was Said http://dis.shefac.uk/stevewhittaker/chi2000_voicemal_final.pdf; 8 pages, 2000.
Woitaszek et al.; Identifying Junk Electronic Mail in Microsoft Outlook with a Support Vector Machine, http://ieeexplore.ieee.org/ie15/8426/26546/01183045.pdf?isnumber=26546&prod=CNF&arnumber=1183045&arSt=+166&ared=+169&arAuthor+Woitaszek%2C+M.%3B+Shaaban%2C+M.%3B+Czernikowski%2C+R ; 2003; 4 pages, 2003.

* cited by examiner

*Primary Examiner* — Khanh Pham
(74) *Attorney, Agent, or Firm* — Merchant & Gould

(57) ABSTRACT

A method is presented for generating a list of frequently used words for an email application on a server computer. When a request is received for a word frequency list for emails stored in a user's mailbox, a word frequency list is returned if one exists. If the word frequency list does not exist, an asynchronous process is started on the server computer to generate a word frequency list. If the word frequency list exists but it is older than an aging limit, an asynchronous process is started on the server computer to regenerate the word frequency list. The word frequency list is stored in the user's mailbox along with a timestamp indicating the date and time that the list was created or updated.

19 Claims, 6 Drawing Sheets

USING MESSAGE SAMPLING TO DETERMINE THE MOST FREQUENT WORDS IN A USER MAILBOX

BACKGROUND

Knowledge of the most frequent words in a user's personal data, including email, is very useful because it can help predict user behavior. This knowledge can be useful, for example, in creating an advertising strategy for the user or in an application that automatically organizes the user's information.

Modern email systems have the capability of receiving voice mail messages and transcribing the voice mail messages into text messages that can be stored in a user's mailbox. Knowledge of the most frequently used words in a user's mailbox can also be used as an aid to machine-based recognition software to more accurately transcribe voice mail messages into text messages.

SUMMARY

Embodiments of the invention are directed to generating a list of frequently used words for an email application on a server computer. A request is received on the server computer to provide a list of frequently used words in email messages stored in a user's mailbox on the server computer. If a word frequency list already exists on the server computer, the word frequency list is returned. If a word frequency list does not exist, an asynchronous process is started on the server computer to generate a word frequency list. If a word frequency list does exist but the age of the word frequency list is greater than an aging limit, the same asynchronous process is started on the server computer to regenerate the word frequency list. The word frequency list is stored in the user's mailbox and a timestamp, indicating the date and time when the word frequency list was created or updated, is stored in the user's mailbox.

The details of one or more techniques are set forth in the accompanying drawings and the description below. Other features, objects, and advantages of these techniques will be apparent from the description, drawings, and claims.

DETAILED DESCRIPTION

The present application is directed to systems and methods for determining the most frequently used words in a user's mailbox. A random sample of email messages in a user's mailbox is parsed, unique words are identified in each email message, and a count of the number of email messages containing each unique word is tabulated and stored. The messages are sampled using a technique of distributed random sampling, by which one or more server memory blocks are obtained at random, the contents are read into a buffer and a predetermined number of emails messages are parsed from one server memory block before another server memory block is obtained. The use of distributed random sampling improves the efficiency of reading and parsing email messages stored in server computer memory.

Figure 1:
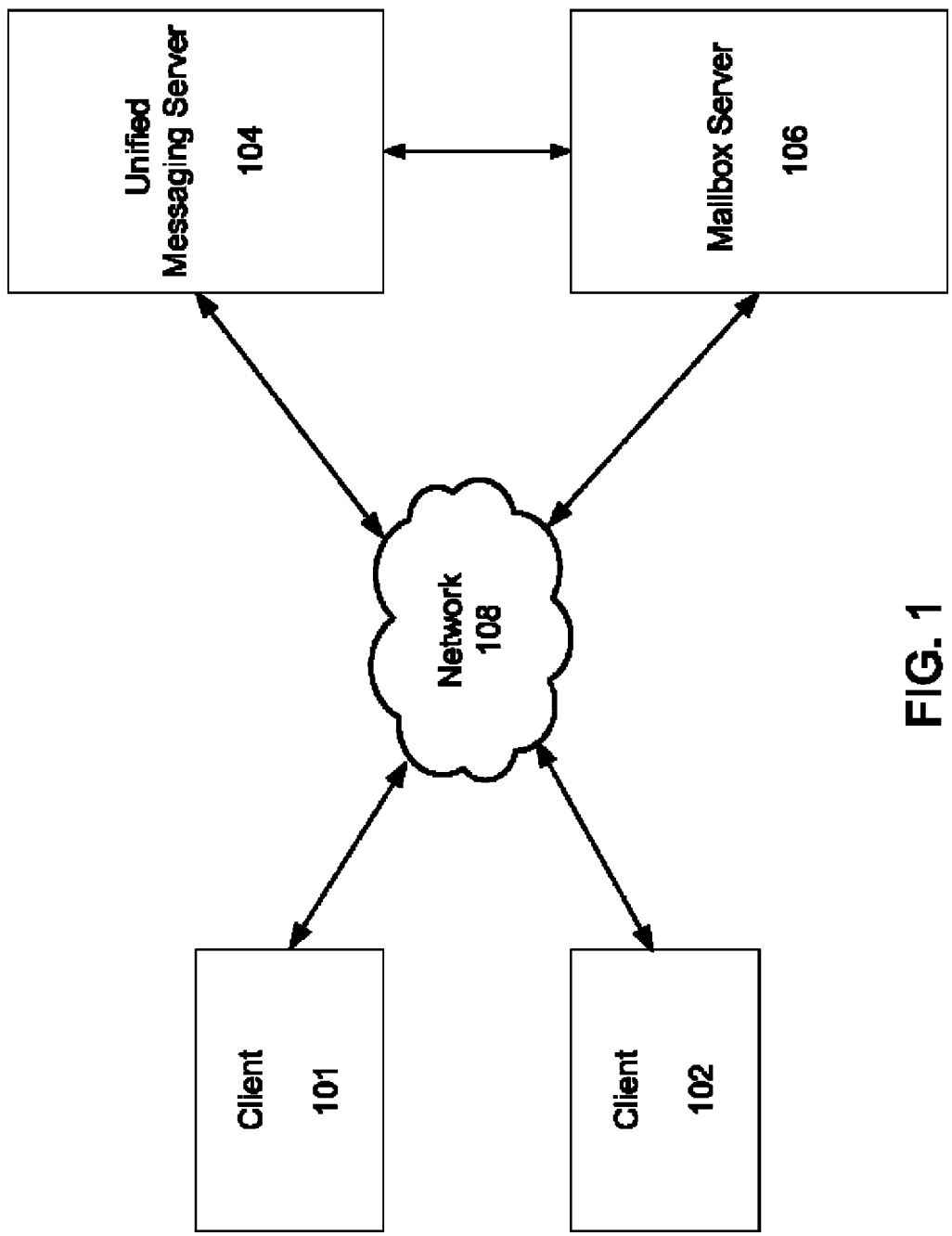
FIG. 1 shows an example system for determining the most frequently used words in a user's mailbox.

FIG. 1 shows an example system 100 that can be used to determine the most frequently used words in a user mailbox. This example system 100 is typically used in conjunction with computer generated text transcription of voice mail messages. The example system 100 includes two client computers 101 and 102, a unified messaging server 104, a mailbox server 106 and a network 108.

The example client computers 101 and 102 run a client-based email application, such as Microsoft Outlook from Microsoft Corporation of Redmond, Wash. The example unified messaging server 104, combines voice messaging and email into one mailbox. An example unified messaging server is the Unified Messaging Server that is part of Microsoft Exchange 2007 from Microsoft Corporation of Redmond, Wash. The example mailbox server 106 includes a plurality of databases, each of which includes a plurality of mailboxes. An example mailbox server is the Mailbox Server that is part of Microsoft Exchange Server 2007 from Microsoft Corporation of Redmond, Wash.

Client computers 101 and 102 communicate with the example unified exchange server 104 and with the example mailbox server 106 over wide-area network 108. The example unified exchange server 104 and example mailbox server 106 are typically located on the same physical site and may communicate with each other over a local area network. In some embodiments, the example unified exchange server 104 and example mailbox server 106 are located on the same physical server computer.

Figure 2:
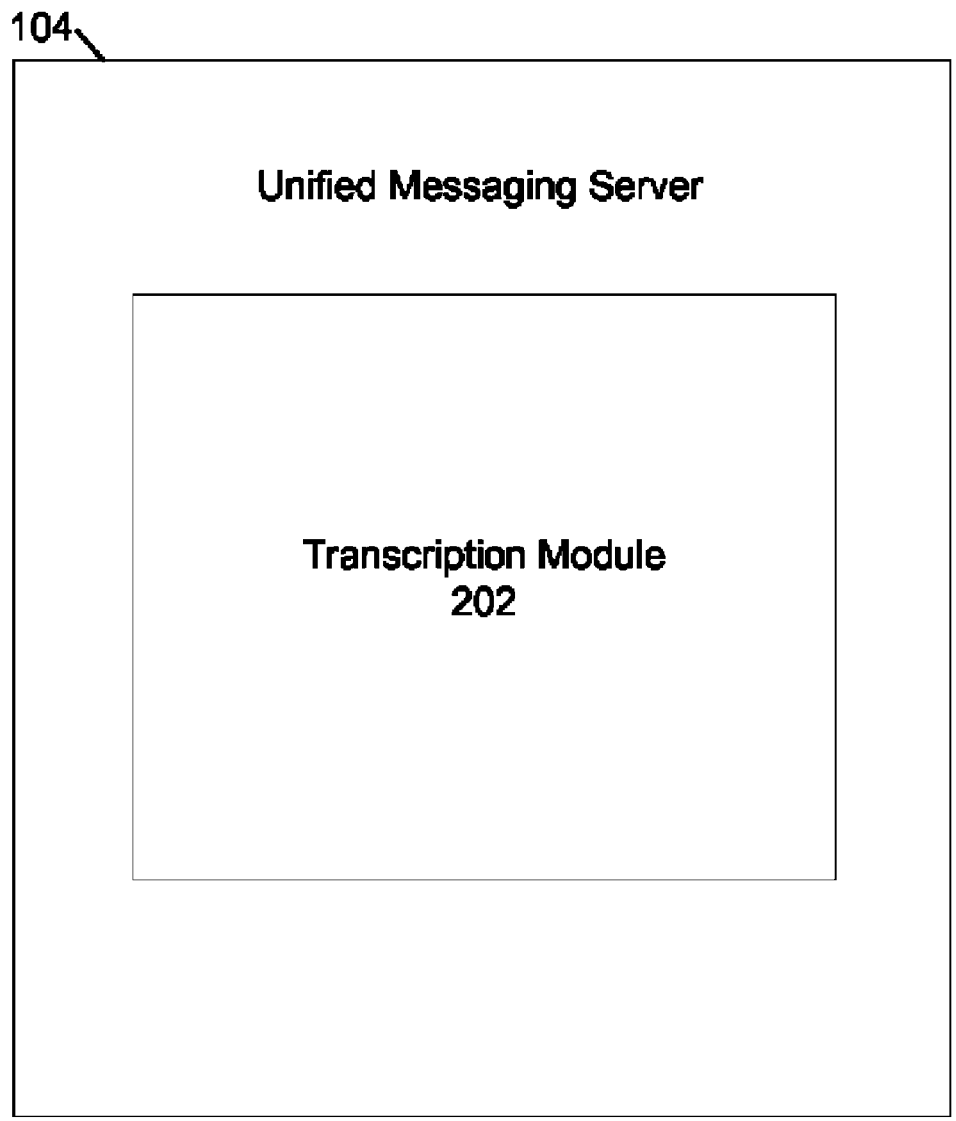
FIG. 2 shows modules of an example unified messaging server.

FIG. 2 shows that the example unified messaging server 104 includes an example transcription module 202. The example transcription module 202 transcribes received voice mail messages into text messages. The example transcription module 202 includes software that automates the voice to text transcription process, often making best guesses for words that sound alike. For example, it may be difficult for the transcription module software to distinguish between similar sounding names such as Perry and Terry. When used in conjunction with a word frequency list, if Perry has a much higher frequency of occurrence in a user's mailbox than Terry, the example transcription module 202 can use this information to make a more accurate translation.

In other embodiments, there may be additional applications for a word frequency list. In one example, a word frequency list may be used as an aid in directing online advertising to a user. For example, if a user has a high occurrence of the words Nautica and Polo, advertising may be directed to the user's mailbox for those products. Other uses for word frequency lists are possible.

Figure 3:
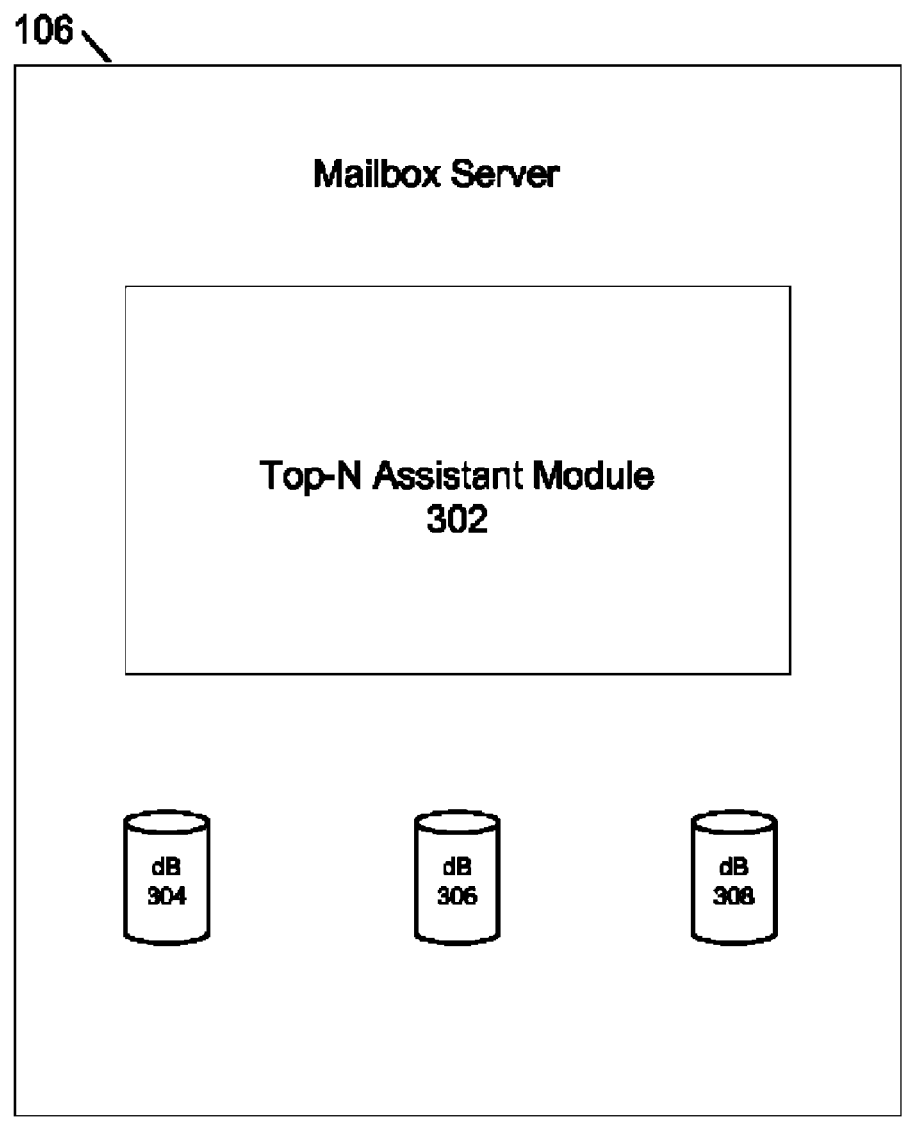
FIG. 3 shows modules of an example mailbox server.

FIG. 3 shows that the example mailbox server 106 includes example top-N assistant module 302 and example databases 304, 306 and 308. Typically mailbox servers include more than three databases. Each database typically includes hundreds or thousands of mailboxes. A unique word frequency list is stored for each mailbox.

The example top-N assistant module 302, determines if a word frequency list exists in a user's mailbox, returns the list to a calling process if the list exists and marks the user's mailbox for list generation if the list doesn't exist. Thus, the top-N assistant module 302 determines the most frequently used words, i.e. the top-N words.

Each word frequency list has a timestamp associated with it, indicating when the list was created or last generated. An aging parameter, configurable by an administrator, determines whether the list is current. A typical value for the aging parameter is 30 days. If a word frequency list is older than the limit specified by the aging parameter, the user's mailbox is marked so that the word frequency list can be regenerated.

A word frequency list is generated on an asynchronous basis because the list generation process is very I/O intensive. If the example top-N assistant module 302 receives a request for a list and the list does not exist, the user's mailbox is marked for list generation but the response to the request is null, indicating that the list does not exist. If a word frequency list does exist but it is not current, being older than the aging parameter allows, the user's mailbox is marked for list generation but the response to the request is return the current list. In addition, a word frequency list may be marked for regeneration on a periodic basis independent of receiving a request for a list. For example, the top-N assistant module 302 may periodically scan all mailboxes and mark mailboxes to regenerate word frequency lists if a timestamp on the word frequency list indicates that the list is more than a predetermined time period, for example more than a month old.

When a user's mailbox is marked for list generation, the server computer determines an appropriate time for an asynchronous process to run and generate the list. The asynchronous process runs when the server computer has the resources available to run the process. This is done to reduce the impact of list generation on mailbox server operation.

The example top-N assistant module 302 generates the word frequency list by parsing a predetermined number of user email messages and determining the number of email messages that contain each unique word. For example, if the word "bicycle" occurs 10 times in one email message, three times in another email message and is not contained in any other email message in the sample, bicycle is assigned a word frequency count of two. It has been estimated that parsing 2000 email messages yields 5,000-10,000 unique words, although this is very subjective and depends on the content of the email messages. It is possible that parsing 2000 email messages may yield 30,000 or more unique words.

In an example embodiment, the top-N assistant module 302 uses the method of distributed random sampling of the server memory to generate the word frequency list. This is a method than has been shown to be more efficient and less I/O intensive for sampling the entire server computer memory than other sampling methods such as non-distributed random sampling (i.e. selecting email messages at random from any part of the server computer memory) and sequential sampling of email messages (where a plurality of email messages are sampled from consecutive logical locations in memory).

Server computer memory is organized in contiguous areas of the server disk known as blocks. Typically, a block is an area of disk, for example 32 MB, which can be read into buffer memory in one I/O operation. The server computer memory contains many databases and each database contains many mailboxes. When a block of server computer memory is obtained, it may contain email messages from more that one database and from more than one mailbox. The method of distributed random sampling samples a fixed number of email messages (for example 10 email messages) from one randomly obtained block before another server memory block is randomly obtained and the same fixed number of email messages is sampled.

In distributed random sampling, a block of server computer memory is randomly selected and read into a buffer. A fixed number of user email messages (for example 10 email messages) are parsed in each email message, breaking up the email message into unique words using standard word-breaking software. For the first user email message parsed the block, each unique word is given a count of one, because it occurs in at least one email message. For the next user email message in the block, each unique word is determined and the list of email messages is updated. For any unique word in the email message already on the list, the count is updated, indicating that the email message appears in at least two email messages. If the unique word isn't on the list, the unique word is added to the list and given a count of one. This process continues for each user email message in the block until either the fixed limit of email messages in the block is reached (for example 10) or until the total number of email messages that needs to be sampled (for example 2000) is reached.

If the fixed limit of user email messages in a block is reached and if the total of email messages parsed is less than the sample size, then another server memory block is randomly selected and read into the buffer. The same fixed number of email messages is then parsed, the unique words in each parsed email message are identified and the word frequency list is updated. The distributed random sampling process continues in a similar manner with additional server memory blocks being randomly sampled, read into buffer memory and parsed until the sample size of user email messages is reached.

In example embodiments, other sampling methods may be used. For example, in non-distributed random sampling, the entire server computer memory may be randomly sampled. This sampling method is more I/O intensive than distributed random sampling, but it typically provides the best results for an entire mailbox. In another embodiment, email messages may be sampled from a contiguous area of memory. For example, the latest N email messages may be sampled from the latest M blocks written on the server computer disk. This method is best for I/O optimization and reflects to a high degree, the word frequency count of the latest N email messages.

The word frequency list for each mailbox is stored in a folder in the user's mailbox and is accessible when a request for the list is made. The word frequency list is added to the mailbox server index so that the list can be easily located and returned. For example, in Microsoft Exchange 2007, the word frequency list is stored as a folder associated item (FAI item). The content index of the mailbox server is updated with each FAI item so that the FAI item can be readily located and obtained. The FAI item also includes a timestamp indicating the age of the word frequency list.

The aging limit for regeneration of a word frequency list and the number of emails sampled to produce the word frequency list are configurable by a system administrator. Typically, the aging limit is 30 days, but there may be applications for which this aging limit may be increased or decreased. Similarly, a typical sample size of 2000 email messages may be modified for a specific application or if it is determined that a different level of granularity is needed. A common initial value for a sampling size is a value equal to 20% of the email messages in a user's mailbox.

When compiling the word frequency list, it is important to filter out words that may be irrelevant or not important. A system of heuristics is provided that results in certain types of words being excluded from the word frequency list. For example, words containing one or more numbers are not included in the list. Words containing non-language characters (for example jdoe@microsoft.com) are not included in the list. In addition, words that do not contain a vowel are not included in the list.

Figure 4:
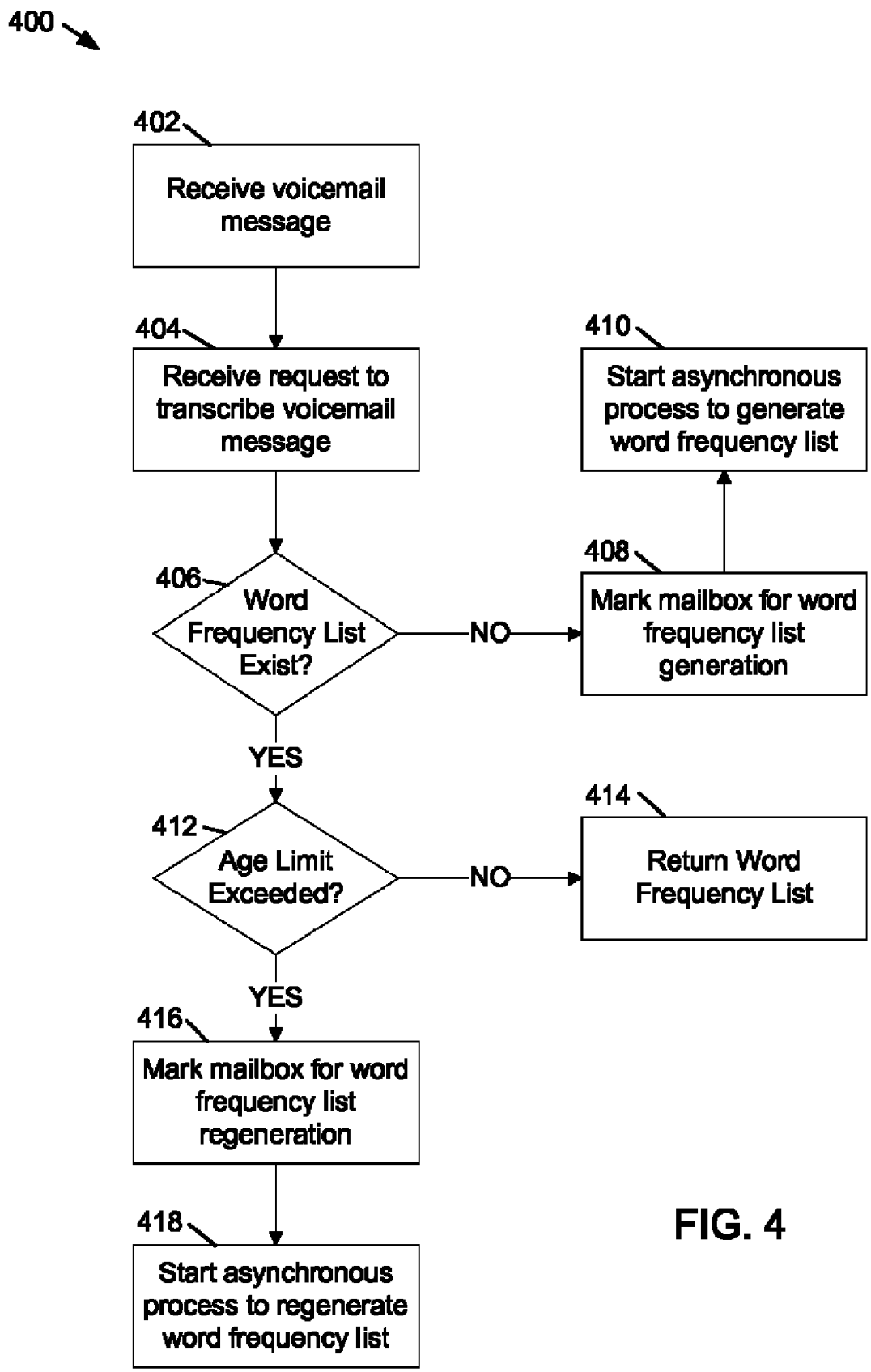
FIG. 4 shows a flowchart for an example method for determining the most frequently used words in a user's mailbox.

FIG. 4 is a flowchart showing a method for generating a list of frequently used words for a mailbox application on a server computer based on a transcription request from a voicemail application. At operation 402, a voicemail message for a user is received on a unified messaging server. At operation 404, the server computer, typically a mailbox server, receives a request to transcribe the voicemail message into text. At operation 406 a determination is made as to whether a word frequency list exists in the user's mailbox. In some embodiments, for example on Microsoft Exchange Server 2007, this is done by checking the FAI item in the mailbox corresponding to the word frequency list. If the word frequency list does not exist on the user's mailbox, at operation 408, the user's mailbox is marked for word frequency list generation. At operation 410, an asynchronous process is started to generate the word frequency list. In addition, a response is returned to the calling voicemail application indicating that the list doesn't exist.

If the word frequency list does exist, the timestamp of the word frequency list is checked at operation 412 to determine if the list is stale. If the age limit has not been exceeded, indicating that the list is still fresh, the word frequency list is returned at operation 414. If the age limit is exceeded, the user's mailbox is marked for word frequency list generation at operation 416 so that the list can be refreshed at operation 418 when the asynchronous process that generates the word frequency list runs.

Figure 5:
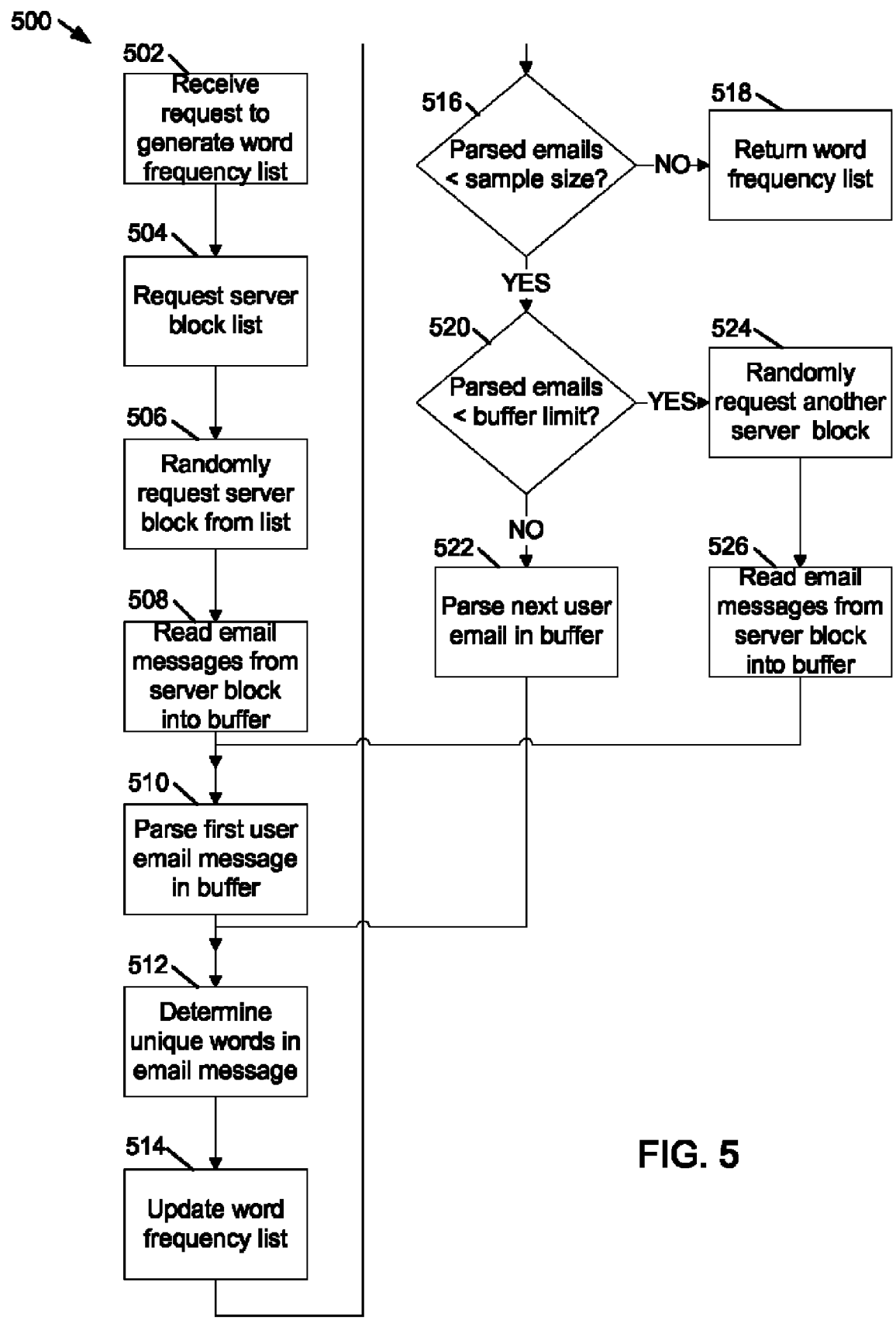
FIG. 5 shows a flowchart for an example method for sampling server memory by distributed random sampling to determine the most frequently used words in a user's mailbox.

FIG. 5 shows a flowchart for sampling memory on a server computer to generate a word frequency list for an email application. At operation 502, a request is received to generate a word frequency list for a user's mailbox on a server computer. At operation 504, a server block list is generated for the server computer. The server block list provides a list of server memory blocks, each block containing at least one email from the user's mailbox. At operation 506, a server memory block is randomly selected from the list. At operation 508, the contents of the server memory block is read into a buffer. At operation 510, the first email message from the user's mailbox in the buffer is parsed. At operation 512, the unique words in the email message are determined. As discussed earlier, heuristics are used to exclude words containing numbers, non-language characters and words not containing a vowel. At operation 514, the word frequency list is updated and stored in the user's mailbox, typically as an FAI item. If a new word is added to the word frequency list, that word is given a count of one, indicating that the word is associated with one email message. The counts for unique words in the email message already included in the word frequency list are incremented by one.

At operation 516, it is determined whether the count of email messages parsed is less than a predetermined sampling size, typically 2000 emails. If the sampling size limit has been reached, at operation 518, the word frequency list is returned to the calling application. If the sampling size limit has not been reached, at operation 520 it is determined whether the limit for emails parsed in one block has been reached. As part of distributed random sampling, only a maximum of a predetermined number of email messages is parsed in each block, typically 10 email messages per block. If the limit has not been reached, for example only one message in the block has been parsed, at operation 522 the next email message in the buffer is parsed. The unique words in the email message are determined at operation 512 and word frequency list is updated at operation 514. Then, at operation 516, another check is made to determine whether the sample size has been reached.

If operation 520 determines that the number of email messages in the block is equal to the limit of email messages to be parsed for the block, for example 10 email messages, another server memory block is randomly requested at operation 524. The contents of the server memory block are read into a buffer at operation 526 and the contents of the first email message in the buffer are parsed at operation 510. The number of unique words in the email message is determined at operation 512 and the word frequency list is updated at operation 514. Then, at operation 516, another check is made to determine whether the sample size has been reached.

Figure 6:
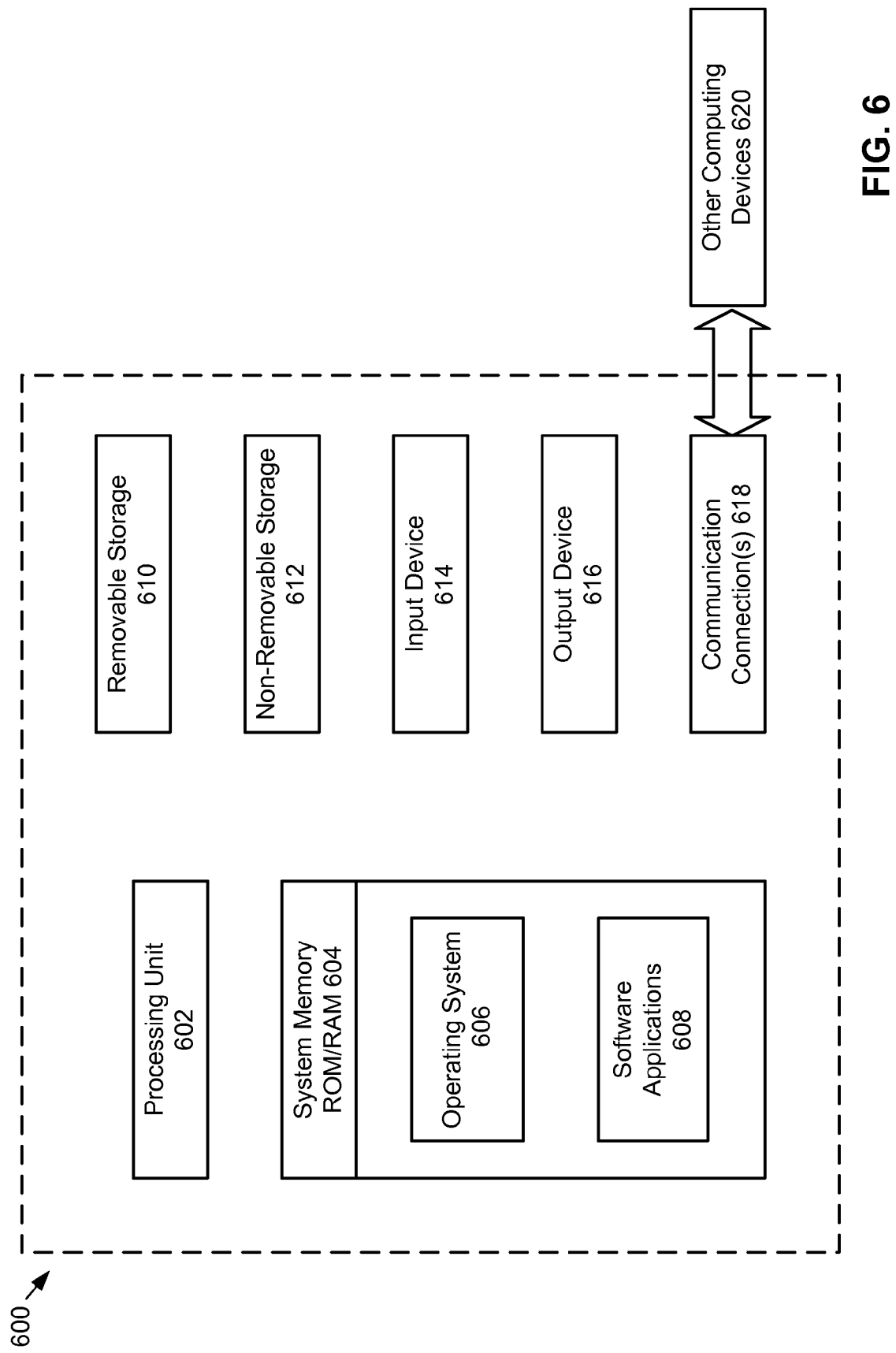
FIG. 6 shows an operating environment for a system in which the most frequently used words in a user's mailbox can be determined.

With reference to FIG. 6, one exemplary system for implementing the invention includes a computing device, such as computing device 600. In a basic configuration, the computing device 600 typically includes at least one processing unit 602 and system memory 604. Depending on the exact configuration and type of computing device, the system memory 604 may be volatile (such as RAM), non-volatile (such as ROM, flash memory, etc.) or some combination of the two. System memory 604 typically includes an operating system 606 suitable for controlling the operation of a networked personal computer, such as the WINDOWS® operating systems from MICROSOFT CORPORATION of Redmond, Wash. or a server, such as Windows Sharepoint Server 2007, also from MICROSOFT CORPORATION of Redmond, Wash. The system memory 604 may also include one or more software applications 608 and may include program data.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 610 and non-removable storage 612. Computer storage media may include volatile and nonvolatile, removable and non-removable media implemented in any method or technology for storage of information, such as computer readable instructions, data structures, program modules, or other data. System memory 604, removable storage 610 and non-removable storage 612 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 614 such as keyboard, mouse, pen, voice input device, touch input device, etc. Output device(s) 616 such as a display, speakers, printer, etc. may also be included. These devices are well known in the art and need not be discussed at length here.

The computing device 600 may also contain communication connections 618 that allow the device to communicate with other computing devices 620, such as over a network in a distributed computing environment, for example, an intranet or the Internet. Communication connection 618 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The various embodiments described above are provided by way of illustration only and should not be construed to limiting. Various modifications and changes that may be made to the embodiments described above without departing from the true spirit and scope of the disclosure.

What is claimed is:

1. A method for generating a list of frequently used words for an email application on a server computer, the method comprising:
    receiving a request on the server computer to provide a list of frequently used word in email message stored in a user's mailbox on the server computer;
    determining if a word frequency list exists in the user's mailbox;
    if a word frequency list exist, returning the word frequency list;
    if a word frequency list does not exist, starting a asynchronous process on the server computer to generate a word frequency list;
    if a word frequency list does exist and the age of the word frequency list is greater than an aging limit, starting the same asynchronous process on the server computer to regenerate the word frequency list;
    storing the word frequency list in the user's mailbox; and
    storing a timestamp in the user's mailbox, the time stamp indicating the date and time when the word frequency list was created or updated;
    wherein the asynchronous process generates the word frequency list by performing steps comprising:
    sampling email messages from one or more random memory blocks on the server computer;
    parsing a predetermined number of email messages from the user's mailbox from the one or more random memory blocks, the parsing resulting in generating one or more unique words for each email message;
    generating a word frequency list for the one or more unique words, the word frequency list providing a count number of the number of emails in the predetermined number of email message in which each unique word is found.

2. The method of claim 1, wherein the sampling method is distributed random sampling.

3. The method of claim 1, wherein a subset of the predetermined email message is obtained and parsed from a first random memory block before a second random memory block is selected.

4. The method of claim 1, wherein a maximum of 10 email messages are parsed from each random memory block obtained.

5. The method of claim 1, wherein the request is from a voice mail transcription application running on the server computer.

6. The method of claim 1, wherein the voice mail transcription application uses the word frequency list to transcribe a voice mail message into text, the word frequency list being used to help distinguish between similarly sounding words in the voice mail message.

7. The method of claim 1, wherein the request is from a voice mail transcription application running on another server computer.

8. The method of claim 1, wherein the request is from an advertising application on the server computer.

9. The method of claim 1, wherein the aging limit is configurable.

10. The method of claim 1, wherein the predetermined number of email messages parsed from the user's mailbox is configurable.

11. The method of claim 1, wherein words containing one or more number are not included in the word frequency list.

12. The method of claim 1, wherein words containing one or more non-language characters are not included in the word frequency list.

13. The method of claim 1, wherein words not containing a vowel are not included in the word frequency list.

14. A method for sampling memory on a server computer to generate a word frequency list for an email application, the method comprising:
    obtaining a list of one or more server memory blocks that contain email messages for the user's mailbox, each of the one or more server memory blocks storing at least one email message for the user;
    randomly selecting a first server memory block from the list of one or more server memory blocks;
    parsing one or more of the user's email messages contained in the first server memory block, the parsing of the one or more user's email messages breaking each email message up into unique words, the number of email messages being parsed from the first server memory block being less than or equal to a first predetermined limit;
    creating a word frequency list for the email messages parsed, the word frequency list including each unique word obtained during the parsing of the one or more user's email messages that meet predetermined criteria for unique words, each unique word being assigned a count in the word frequency list, the count being updated for each parsed email in which the unique word is found;
    storing the word frequency list on the server computer; and
    if the number of parsed emails is less than a second predetermined limit, randomly selecting a second server memory block from the list of one or more server memory blocks, parsing one or more user's email messages contained in the second server memory block, the number of email messages being parsed from the second server memory block being less than or equal to the first predetermined limit, the parsing breaking up each email message into unique words that meet predetermined criteria for unique words, updating the count in the word frequency list for each unique word already included in the word frequency list, the count being updated for each parsed email in which the unique word is found, adding each unique word to the word frequency list that is not currently included in the word frequency list and storing a count for each of these unique words in the word frequency list.

15. The method of claim 14, further including randomly selecting one or more additional server memory blocks from the list of one or more server memory blocks, parsing email messages from the one or more additional server memory blocks until the second predetermined limit of email messages is reached, one or more email messages being parsed from each of the one or more additional server memory blocks up to the first predetermined limit for each additional server memory block; updating the count of unique words included in the word frequency list for each email message in which the unique word is contained and adding each unique word to the word frequency list that is not already included in the word frequency list and storing a count for each of these unique words.

16. The method of claim 14, wherein the second predetermined limit is configurable.

17. The method of claim 14, wherein the size of the buffer memory corresponds to the size of an I/O read operation for the server computer.

18. The method of claim 14, wherein the predetermined criteria for unique words excludes words containing one or more numbers, containing non-language characters and not containing at least one vowel.

19. A computer-readable storage medium comprising instructions that, when executed by a server computer, cause the server computer to:
   receive a request to provide a list of frequently used words in email messages stored in a user's mailbox on the server computer;
   determine if a word frequency list exists in the user's mailbox;
   if a word frequency list exists, return the word frequency list;
   if a word frequency list does not exist, start an asynchronous process on the server computer to generate a word frequency list;
   if a word frequency list does exist and the age of the word frequency list is greater than an aging limit, start the same asynchronous process on the server computer to regenerate the word frequency list;
   wherein the asynchronous process that generates the word frequency list includes the steps of:
   requesting a list of one or more server memory blocks that contain email messages for the user's mailbox, each of the one or more server memory blocks storing at least one email message for the user;
   randomly selecting a first server memory block from the list of one or more server memory blocks;
   reading into a buffer memory the contents of the first server memory block;
   parsing one or more of the email messages from the buffer memory, the parsing of the one or more email messages breaking each email message up into unique words, the number of email messages being parsed from the buffer memory being less than or equal to a first predetermined limit;
   creating a word frequency list for the email messages parsed, the word frequency list including each unique word obtained during the parsing of the one or more user's email messages that meet predetermined criteria for unique words, each unique word being assigned a count in the word frequency list, the count being updated for each parsed email in which the unique word is found;
   storing the frequency count of each unique word on the server computer;
   if the number of parsed emails is less than a second predetermined limit, randomly selecting a second server memory block from the list of one or more server memory blocks, reading into a buffer memory the contents of the second server memory block, the number of email messages being parsed from the buffer memory being less than or equal to the first predetermined limit, the parsing breaking up each email message into unique words that meet predetermined criteria for unique words, updating the count in the word frequency list for each unique word already included in the word frequency list, the count being updated for each parsed email in which the unique count is found, adding each unique word to the word frequency list that is not currently included in the word frequency list and storing a count for each of these unique words in the word frequency list; and
   if the number of parsed emails is less than the second predetermined limit, randomly selecting one or more additional server memory blocks from the list of one or more server memory blocks, parsing email messages from the one or more additional server memory blocks until the second predetermined limit of email messages is reached, one or more email messages being parsed from each of the one or more additional server memory blocks up to the first predetermined limit for each additional server memory block, the parsing breaking up each email message into unique words that meet predetermined criteria for unique words, updating the count of unique words included in the word frequency list for each email message in which the unique word is contained and adding each unique word to the word frequency list that is not already included in the word frequency list and storing a count for each of these unique words.

* * * * *